UNITED STATES PATENT OFFICE.

JOHN R. THOMAS, OF YOUNGSTOWN, OHIO.

IMPROVEMENT IN FIRE-BRICKS.

Specification forming part of Letters Patent No. 180,391, dated July 25, 1876; application filed May 19, 1876.

*To all whom it may concern:*

Be it known that I, JOHN R. THOMAS, of Youngstown, in the county of Mahoning and State of Ohio, have invented a certain new and useful Composition for Use in Making Fire-Brick, of which the following is a specification:

My invention relates to an improved composition for making fire-bricks, such as are used principally for lining blast-furnaces, building the roofs and sides of puddling and heating furnaces, steel-holes, steel-furnaces of every description, &c.

My composition is applicable in the manufacture of brick for all these purposes, and for all the other purposes to which fire-brick may be applied.

To those skilled in the art of making fire-bricks, description of any method or process of compounding the materials, of the molding, drying, and other steps, is unnecessary, and I have only herein set forth the proportions of the particular materials from which my brick is made, in a manner substantially the same as other fire-brick.

The whole being represented by 100, I take of liquid of lime, 1.00 per cent.; liquid plaster-of-paris, .50 per cent.; soft fire-clay, 10.00 per cent.; quartz pebbles, 10.00 per cent.; ground fire-brick, 14.00 per cent.; sand-rock, 33.00 per cent.; hard fire-clay, 31.50 per cent.

In practice these are the materials I have used; but quartz pebbles, sand-rock, and hard fire-clay were first known to me by the names "flint-clay," "fire-pebbles," and "fire sand-stone."

To prepare the ingredient, which I denominate "liquid of lime," take about four pints of boiling water and one pound of fresh white-lime lumps; stir the mixture well until the lime is dissolved; then let it stand for a while, and then stir well again, ready for use. The liquid plaster-of-paris is prepared in a similar way, using about two pints of cold water to a half pound of plaster-of-paris; stir well, and use at once. After getting these ingredients into the right thickness or consistency, mix them well together with the other ingredients, when the compound will be ready for use as a material from which to make fire-brick.

I claim—

A compound of liquid of lime, plaster-of-paris, soft fire-clay, quartz pebbles, ground fire-brick, sand-rock, and hard fire-clay, from which to make fire-bricks.

In testimony whereof I have affixed my signature in the presence of two witnesses.

JOHN R. THOMAS.

Witnesses:
  ED. W. POOLE,
  M. G. BUTLER.